(No Model.)

J. McINTOSH.
SAW SET.

No. 476,235. Patented May 31, 1892.

Witnesses
James McAdam
Harry Dixon.

Inventor
John McIntosh
by C. H. Riches
his Attorney.

UNITED STATES PATENT OFFICE.

JOHN McINTOSH, OF PORT ELGIN, ASSIGNOR OF ONE-HALF TO MOSES BRICKER, OF LISTOWEL, CANADA.

SAW-SET.

SPECIFICATION forming part of Letters Patent No. 476,235, dated May 31, 1892.

Application filed September 26, 1891. Serial No. 406,933. (No model.)

*To all whom it may concern:*

Be it known that I, JOHN MCINTOSH, of the town of Port Elgin, in the county of Bruce, in the Province of Ontario, Canada, have invented certain new and useful Improvements in Saw-Sets; and I hereby declare that the following is a full, clear, and exact description of the same.

This invention relates to a device for setting the teeth of a crosscut or other saw; and the object of the invention is to so construct the device that it will without injury to the saw rapidly and accurately set the teeth of the same; and it consists, essentially, of the device hereinafter more fully set forth, and more particularly pointed out in the claims.

Figure 1:
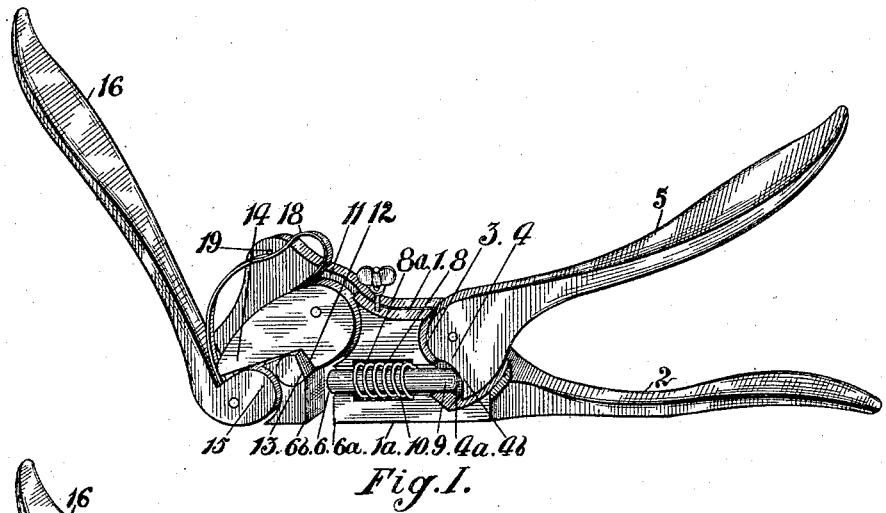
Figure 2:
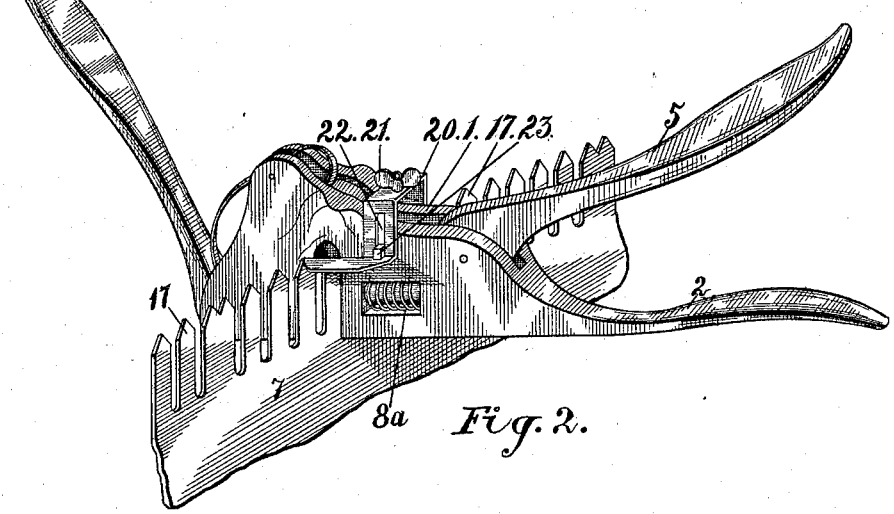

In the drawings, Figure 1 is a perspective view of my improved saw-set with one side removed, showing the working mechanism. Fig. 2 is a perspective view of the same, showing the operation of setting the teeth of what is known as a "lance-tooth" saw.

Like numerals of reference refer to like parts throughout the specification and drawings.

The frame-work of the saw consists of a body 1, of any suitable size and shape, in which is located the operating mechanism of the device, and a grip 2, extending rearward from said body 1. Formed in the rear portion of the body 1 is a recess 3, and pivoted in said recess is a cam-lever 4, fitted with a grip 5 of the same length as the grip 2, said grips being of such a size as to be readily grasped and operated by the hand.

At or near the middle of the body 1 is a passage-way 6, extending inwardly into said body from its lower edge $1^a$ and of sufficient width and height to receive the blade of the saw 7. In the body 1 and slightly below its horizontal axis is a recess 8, fitted with an enlargement $8^a$, in which enlargement is located the recoil-spring 10, coiled on the bolt 9. The recess 8 extends from the passage-way 6 to the recess 3, and located within the recess 8 is the bolt 9, fitted with the recoil-spring 10. The bolt 9 is equal in length to the length of the distance from the rear side $6^a$ of the passage-way 6 to the front edge $4^a$ of the lever 4.

It will be noticed by reference to the drawings that the spring 10 forces the bolt 9 rearward and keeps it continually against the front edge $4^a$ of the lever 4. The pressure of the bolt 9 on the front edge $4^a$ of the lever 4 forces the lower edge of the front side $4^a$ rearward, and consequently moves the point $4^b$ diametrically opposite the point $4^a$ forward, raising the grip 5 into the elevated position shown in the drawings.

By forcing the grip 5 toward the grip 2 the front edge $4^a$ of the lever 4 is brought to bear against the bolt 9 and forces said bolt forward against the blade of the saw 7. The saw 7 is firmly and almost immovably held in the vise formed by the combination of the front side $6^b$ of the passage-way 6 and the front end of the bolt 9. In the front portion of the body 1 is a recess 11, in which is pivoted the swinging jaw 12, which, engaging with the stationary jaw 13, forms the means for setting the teeth of the saw. It might here be stated that the lower jaw 13 forms the inclined or upper part of the passage-way 6, and consists of a piece of hardened metal let into and rigidly fastened to the front side $6^b$ of said passage-way 6, the face of the lower jaw 13 being flush with the face of the side $6^b$. It might also here be stated that the face of the jaw 12 is hardened to correspond to the face of the lower jaw 13. The faces of said jaws are inclined to form the dies of the saw-set.

The swinging jaw 12 is fitted with a cam 14, which extends forward and downward in the recess 11 and engages with the cam 15, pivoted in the bottom part of said recess 11. The cam 15 is fitted with a grip 16, which corresponds in size and shape with the grips 2 and 5.

It will be noticed by reference to the drawings that when the jaws 12 and 13 are opened the grip 16 is in an elevated position. By pressing downwardly upon the grip 16 the cam 15 raises the cammed end 14 of the swinging jaw 12 and forces said swinging jaw toward and upon the stationary jaw 13. The swinging jaw 12 in its travel toward the stationary jaw 13 gradually and without undue strain bends the tooth 17 of the saw 7 to the desired inclination. To return the jaw 12 to its normal or open position the instant the pressure has been released from the grip 16, I provide the recess 11 with a spring 18, which passes beneath the pin 19, extending from side to side of the recess 11. One end of the spring 18 presses upon and bears downwardly the cammed end 14 of the swinging jaw 12, and the opposite end of said spring presses upon and bears downwardly the cammed lever 15. To regulate the gage of the set, I provide the saw-set with an adjustable plate 20, raised and lowered by means of a set-screw 21, working in the threaded aperture in the top of the body 1. To hold the plate 20 in position and prevent any side motion on its part, I provide the bracket portion of said plate with an elongated slot 22 on each side of the body 1, through which slots pass guide-pins 23.

Having thus fully described my invention, what I claim as new, and desire to secure by Letters Patent, is—

1. A saw-set comprising a frame having a recess in its bottom, a stationary jaw forming a part of one side of said recess, a cam pivoted to the frame above the recess and playing through the same to coact with the stationary jaw, means for operating the said cam, and means for holding the saw in the recess.

2. The combination of a frame having pins or lugs on its sides, a screw mounted on the frame, and a gage carried by said screw and having depending side portions provided with slots engaging the pins or lugs on the frame.

3. In a saw-set, the combination of a swinging jaw pivotally secured to the frame-work, having its meeting face hardened and inclined to form one part of the die, the opposite end fitted with a cam operated by a lever pivotally secured to said frame-work, and a stationary jaw forming part of the frame-work and having its meeting face inclined and hardened to form the second die, and a means for holding the saw in position, consisting of an opposing surface and a holding-bolt operated by a lever, substantially as described.

4. In a saw-set, the combination of a swinging jaw pivotally secured to the frame-work, having its meeting face inclined and hardened and fitted with a cam, a lever to operate said cam, a spring to return said cam and lever to their normal positions, a stationary jaw located in and forming part of the frame-work and having its meeting face inclined and hardened to correspond to the inclination of the meeting face of the swinging jaw, a holding-bolt located in said frame-work, a lever to operate said holding-bolt, and an opposing surface between which and the locking-bolt the saw is held, and a means for regulating the gage of the set, substantially as described.

5. In a saw-set, the combination of a swinging jaw pivotally secured to the frame-work, a lever for operating said swinging jaw, a stationary jaw located in and forming part of the said frame-work, the meeting faces of said jaws inclined and hardened to form the die, the holding-bolt located in said frame-work, a lever to operate said holding-bolt, an opposing surface between which and the holding-bolt the saw is firmly held, and a gage to regulate the set of the teeth, substantially as described.

Listowel, August 20, 1891.

JOHN McINTOSH.

In presence of—
J. C. DALRYMPLE,
JOHN A. THOMSON.